(12) United States Patent
Bahr

(10) Patent No.: US 8,638,703 B2
(45) Date of Patent: Jan. 28, 2014

(54) METHOD AND DEVICE FOR DETERMINING A ROUTING-METRIC

(75) Inventor: Michael Bahr, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 326 days.

(21) Appl. No.: 13/002,813

(22) PCT Filed: Jul. 14, 2009

(86) PCT No.: PCT/EP2009/005128
§ 371 (c)(1),
(2), (4) Date: Jan. 18, 2011

(87) PCT Pub. No.: WO2010/012377
PCT Pub. Date: Feb. 4, 2010

(65) Prior Publication Data
US 2011/0194472 A1    Aug. 11, 2011

(30) Foreign Application Priority Data
Jul. 14, 2008   (DE) .......................... 10 2008 033 020

(51) Int. Cl.
*G08C 17/00*  (2006.01)

(52) U.S. Cl.
USPC ........... 370/311; 370/338; 370/238; 370/329; 370/254; 370/252; 370/351

(58) Field of Classification Search
None
See application file for complete search history.

(56) References Cited

U.S. PATENT DOCUMENTS

2003/0033394 A1    2/2003   Stine

| | | | |
|---|---|---|---|
| 2007/0248067 A1* | 10/2007 | Banerjea et al. | 370/338 |
| 2009/0168653 A1* | 7/2009 | St. Pierre et al. | 370/238 |
| 2009/0279464 A1* | 11/2009 | Kakani et al. | 370/311 |

FOREIGN PATENT DOCUMENTS

| WO | 2008122674 A2 | 10/2008 |
|---|---|---|
| WO | 2009135676 A1 | 11/2009 |

OTHER PUBLICATIONS

International Preliminary Report on Patentability for PCT/EP2009/005128 dated Dec. 18, 2009 (Form PCT/IB/373, PCT/ISA/237) (German Translation).

(Continued)

*Primary Examiner* — Ian N Moore
*Assistant Examiner* — Eric H Wang
(74) *Attorney, Agent, or Firm* — Buchanan Ingersoll & Rooney PC

(57) ABSTRACT

The invention relates to a method and a device for which, for determining a routing-metric for a mesh-network, in particular according to standard IEEE 802.11s, routing messages sent in wireless mesh networks or mobile ad-hoc-networks, on various paths of source nodes, via the mesh nodes of the mesh networks to the target nodes, are evaluated in order to determine the best path for transferring data packets from source nodes to target nodes. Said nodes are battery-operated and mesh nodes are only used in the energy-saving mode as intermediate nodes of a path when this can not be prevented due to necessary connectivity in the mesh network or due to predetermined guidelines. Also, in each routing message sent from source nodes to target nodes via various paths, a plurality of bits, preferably two bits, are used for the number of mesh nodes operating in the path in the energy-saving mode or are battery-operated when the remaining bits of the routing-message are used for the path metric.

19 Claims, 6 Drawing Sheets

(56) References Cited

OTHER PUBLICATIONS

International Preliminary Report on Patentability for PCT/EP2009/005128 dated Dec. 18, 2009 (Form PCT/IB/373, PCT/ISA/237) (English Translation).
Written Opinion of the International Searching Authority PCT/EP2009/005128 dated Dec. 18, 2009 (Form PCT/ISA/237) (English Translation).
IEEE: Draft Standard for Information Technology—Telecommunications and Information Exchange between Systems—Local and Metropolitan Are Networks—Specific Requirements IEEE, Piscataway, NJ, USA, Mar. 1, 2008, XP040429893, pp. 183-214.
Xia et al., "A Lightweight and Self-Adaptive Ad Hoc Routing Scheme for EUROPCOM Networks", Communications and Vehicular Technology in the Benelux, 2007, 14th IEEE Symposium, Nov. 15, 2007 IEEE, Piscataway, NJ, USA pp. 1-3.
Gong, "Thoughts on Interaction between Power Management and Path Selection", Jul. 10, 2007.
International Search Report for PCT/EP2009/005128 dated Dec. 18, 2009 (Form PCT/ISA/210) (German Translation).
International Search Report for PCT/EP2009/005128 dated Dec. 18, 2009 (Form PCT/ISA/210) (English Translation).
Written Opinion of the International Searching Authority for PCT/EP2009/005128 (Form PCT/ISA/237) (German Translation).
IEEE P802.11s/D2.0 Draft Standard for Information Technology. IEEE P802.11s/D2.0 Draft-Standard, Mar. 2008, I-XVII1-242.
Lan D. Chakeres, Elizabeth M. Belding-Royer. Transparent Influence of Path Selection in Heterogeneous Ad hoc Networks, 15th IEEE International Symposium on Personal, Indoor and Mobile Radio Communications (PIMRC, Sep. 2004, 3.
Charles E. Perkins; Elizabeth M. Belding-Royer; Samir R. Das. Ad hoc On-Demand Distance Vector (AODV) Routing. IETF RFC 3561, Experimental, Jul. 2003, 1-36.
Von Michelle Gong; Kazuyuki Sakoda, Jarkko Kneckt. Thoughts on Interaction between Power Management and Path Selection, Jul. 2007.
Von Liwen Chu; George Vlantis; Symmetrical Airtime Link Metric Report and Path Loop Avoidance, Apr. 2008.

\* cited by examiner

| Possible Paths | Path Metric | Hop Count | Selection According To Rule | | | | | | | |
|---|---|---|---|---|---|---|---|---|---|---|
| | | | a | b | c | d | e | f | g | h |
| MP 1 --> MP 4 --> MP 5 --> MP 6 --> MP 8 | 460 | 4 | x | | | | | | | |
| MP 1 --> MP 4 --> MP 5 --> MP 7 --> MP 8 | 500 | 4 | | x | x | x | x | x | x | x |
| MP 1 --> MP 2 --> MP 3 --> MP 5 --> MP 6 --> MP 8 | 535 | 5 | | | | | | | | |
| MP 1 --> MP 2 --> MP 3 --> MP 5 --> MP 7 --> MP 8 | 575 | 5 | | | | | | | | |

Fig. 3

| Possible Paths | Path Metric | Hop Count | Selection According To Rule ||||||||
|---|---|---|---|---|---|---|---|---|---|---|
| | | | a | b | c | d | e | f | g | h |
| MP 1 --> MP 4 --> MP 5 --> MP 6 --> MP 8 | 460 | 4 | x | x | | x | x | x | x | x |
| MP 1 --> MP 4 --> MP 5 --> MP 7 --> MP 8 | 500 | 4 | | | | | | | | |
| MP 1 --> MP 2 --> MP 3 --> MP 5 --> MP 6 --> MP 8 | 535 | 5 | | | | | | | | |
| MP 1 --> MP 2 --> MP 3 --> MP 5 --> MP 7 --> MP 8 | 575 | 5 | | | | | | | | |

Fig. 4

| Possible Paths | Path Metric | Hop Count | Selection According To Rule ||||||||
|---|---|---|---|---|---|---|---|---|---|---|
| | | | a | b | c | d | e | f | g | h |
| MP 1 --> MP 4 --> MP 5 --> MP 6 --> MP 8 | 460 | 4 |   | x |   |   |   |   |   |   |
| MP 1 --> MP 4 --> MP 5 --> MP 7 --> MP 8 | 500 | 4 |   |   |   |   |   |   |   |   |
| MP 1 --> MP 2 --> MP 3 --> MP 5 --> MP 6 --> MP 8 | 535 | 5 |   |   | x | x | x | x | x | x |
| MP 1 --> MP 2 --> MP 3 --> MP 5 --> MP 7 --> MP 8 | 575 | 5 | x |   |   |   |   |   |   |   |

Fig. 5

| Possible Paths | Path Metric | Hop Count | Selection According To Rule | | | | | | | | |
|---|---|---|---|---|---|---|---|---|---|---|---|
| | | | a | b | c | d | e | f | g | h |
| MP 1 --> MP 4 --> MP 5 --> MP 6 --> MP 8 | 460 | 4 | | x | x | x | x | x | | x |
| MP 1 --> MP 4 --> MP 5 --> MP 7 --> MP 8 | 500 | 4 | | | | | x | x | x | |
| MP 1 --> MP 2 --> MP 3 --> MP 5 --> MP 6 --> MP 8 | 535 | 5 | | | | | | | | |
| MP 1 --> MP 2 --> MP 3 --> MP 5 --> MP 7 --> MP 8 | 575 | 5 | | | | | | | | |

Fig. 6

METHOD AND DEVICE FOR DETERMINING A ROUTING-METRIC

CROSS-REFERENCE TO RELATED APPLICATIONS

This application is the United States national phase under 35 U.S.C. §371 of PCT International Application PCT/EP2009/005128, filed on Jul. 14, 2009, and claiming priority to German Application No. 10 2008 033 020.5, filed on Jul. 14, 2008. Both applications are incorporated by reference herein.

BACKGROUND OF THE INVENTION

1. Field of the Invention

Embodiments relate to methods and devices for establishing a routing metric in mesh networks, in particular according to standard IEEE 802.11s for Wireless Mesh Networks, wherein the routing messages sent on various paths from the source node via the mesh nodes of the mesh network to the target node are interpreted in order to determine the best path for sending data packets from the source node to the target node.

2. Background of the Related Art

WO 2008/122674 A2 relates to a method for operating a mesh-type network, in particular according to standard IEEE 802.11s, wherein the network comprises multiple network nodes. From this it is known that six addresses are to be used in the data packets.

In the PCT application PCT/EP2009/003271 filed on May 7, 2009, a method and device for generating at least one extension of an allocation message for wireless mesh networks are described, in which the creation of possible allocation tables for data packets to be transmitted is described.

A fundamental principle of wireless mesh networks or mobile ad hoc networks is the forwarding of data packets from other nodes through the mesh nodes. This means that a mesh node also needs power for sending and receiving data packets, even if the node itself has nothing to send or receive. This can cause more rapid battery consumption by battery-operated mesh nodes.

To extend battery life, battery-operated devices often also use an energy-saving mode, which puts their wireless interfaces temporarily into a sleep mode. This sleep mode requires only a very small amount of power, but devices in sleep mode cannot send or receive data packets. There is no loss of data, because the data packets can be stored temporarily until the device in energy-saving mode comes out of its sleep mode. However, this increases the delay in transmitting the packet. Depending on the sleep mode duration, this can be a significant amount of time, especially with multi-hop connections through devices in energy-saving mode in wireless mesh networks or mobile ad hoc networks.

Standard IEEE 802.11s on WLAN Mesh Networking, which is currently being developed as Version "IEEE P802.11s™/D2.0 Draft STANDARD for Information Technology—Telecommunications and Information Exchange between Systems—Local and metropolitan area networks—Specific requirements, Part 11: Wireless LAN Medium Access Control (MAC) and Physical Layer (PHY) specifications, Amendment <number>: Mesh Networking," March 2008, pages 1-XVII and 1-242—hereinafter designated as "IEEE P802.11s/D2.0 Draft Standard"—describes in its Section 11 B.9, pages 181-206, the routing protocol "Hybrid Wireless Mesh Protocol (HWMP)," which includes a management variable that establishes whether or not a mesh node should forward data packets to other mesh nodes. If no data packets should be forwarded, the routing messages are processed by HWMP in such a way that no path can be created through these nodes. However, because such non-forwarding nodes can be only the end or start point of a path, the mesh network might break into two or more sections if that node is the only connection.

In the publication by Ian D. Chakeres, Elizabeth M. Belding-Royer: "Transparent Influence of Path Selection in Heterogeneous Ad hoc Networks," 15th IEEE International Symposium on Personal, Indoor and Mobile Radio Communications (PIMRC), Barcelona, Spain, September 2004, 3 pages, a characteristic of the Ad hoc On-Demand Distance Vector (AODV) is used in selecting the path. The target node responds in Standard AODV [see also Charles E. Perkins, Elizabeth M. Belding-Royer, Samir R. Das: "Ad hoc On-Demand Distance Vector (AODV) Routing," IETF RFC 3561 (Experimental), July 2003, pages 1-36] only to the first route request message; subsequent route request messages are ignored. For this reason, forwarding of route request messages to battery-operated mesh nodes is delayed, so that route request messages from paths without battery-operated interim mesh nodes or with the fewest battery-operated interim mesh nodes are received first by the target node. HWMP from IEEE P802.11s/D2.0 Draft Standard is indeed based on AODV, but it recognizes all route request messages to the target mesh node. This mechanism therefore cannot be used in an IEEE P802.11s/D2.0 Draft-Standard mesh network with HWMP.

In the publication by Michelle Gong, Kazuyuki Sakoda, Jarkko Kneckt: "Thoughts on Interaction between Power Management and Path Selection," July 2007, IEEE 802.11, Document 11-07/2095r3, pages 1-23 and in particular pages 17-18, two ideas are mentioned regarding how paths through battery-operated mesh nodes can be avoided:

In the first idea, which is only roughly outlined, mesh nodes are classified depending on their power source (power cable or battery) and on the battery status (non-critical/critical). This classification is relayed by beacons, so that routing messages can be forwarded selectively.

In the second idea, a wake-up bit is attached to the routing messages. If it is not added, battery-operated mesh nodes ignore those routing messages. If it is added, those routing messages are processed through the battery-operated mesh nodes. If a node wants to create a path, initially the wake-up bit is not added, so that in the case of successful path creation, no battery-operated devices are included in that path. If no path can be created, the wake-up bit is added, so that now battery-operated devices can also be considered for creating the path.

This method has three significant disadvantages:

The long wait time until a path is found, if only paths through battery-operated devices are available.

A path through multiple battery-operated mesh nodes with a very good path metric is preferred over a path with only one battery-operated mesh node but a somewhat poorer path metric, even if the poorer path is qualitatively satisfactory and has a better power balance.

The target mesh node receives no information about whether or not a path runs through battery-operated mesh nodes.

In the publication by Liwen Chu, George Vlantis: "Symmetrical Airtime Link Metric Report and Path Loop Avoidance," April 2008, IEEE 802.11 Document 11-08/0636r0, pages 1-10 and in particular pages 3-4, it is proposed that battery-operated mesh nodes add the length of the beacon interval divided by 2 to the link metric. This proposal was made specifically for the airtime link metric included in the IEEE P802.11s/D2.0 Draft-Standard. It means that battery-operated mesh nodes are rarely selected, but the target mesh node receives no information about whether or not a path runs through battery-operated mesh nodes.

BRIEF SUMMARY OF THE INVENTION

Embodiments of the invention establish paths in wireless mesh networks or mobile ad hoc networks in such a way that mesh nodes which are battery-operated or in energy-saving mode are used as interim nodes in a path only if this is allowable based on the required connectivity in the mesh network or on preset guidelines.

Using the invented method, when establishing a routing metric in mesh networks, in particular according to IEEE standard 802.11s for Wireless Mesh Networks, the routing messages sent on various paths from the source node via the mesh nodes of the mesh network to the target node are interpreted in order to determine the best path for sending the data packets from the source node to the target node.

In this process, in each routing message sent from the source node through the various paths to the target node, a quantity of bits, preferably two bits, is used for the number of mesh nodes in the path that are in energy-saving mode or are battery-operated, while the remaining bits in the routing message are used for the path metric.

The selection of the best path is preferably based on preset selection rules. In general, the preferred path selected is the one that has the fewest mesh nodes or hops and whose path metric lies within a preset threshold value, such that if the number of mesh nodes that are battery-operated or in energy-saving mode is the same, the path with the better path metric is selected.

Various embodiments may have the following significant advantages:
  The invention improves the consideration of battery-operated mesh nodes and mesh nodes in energy-saving mode during path selection in wireless mesh networks.
  The target node that is affected by a particular path selection receives explicit quantitative information about the presence and number of battery-operated devices in the corresponding paths.
  The actual path metric, which often reflects the wireless environment and often disregards the battery operation of individual devices in the path, is not changed. This means that the target node receives correct information about the path metric, regardless of the number of battery-operated devices in the path.

BRIEF DESCRIPTION OF THE FIGURES

Four exemplary embodiments of the invention are described using the attached figures. They show:
FIG. 3: for a first exemplary embodiment in table form with four possible paths, the 30 respective allocated path metric values m_A, m_:B, . . . , m_X, the number of respective hops, and the respective selection of possible paths according to rules a) to h) for the mesh network in FIG. 2, wherein none of the mesh nodes involves a device in energy-saving mode or a battery-operated device.
FIG. 4: for a second exemplary embodiment in table form with four possible paths, the respective allocated path metric values m_A, m_:B, . . . , m_X, the number of respective hops, and the respective selection of possible paths according to rules a) to h) for the mesh network in FIG. 2, wherein only the mesh node: MP 7 involves devices in energy-saving mode or battery-operated devices.
FIG. 5: for a third exemplary embodiment in table form with four possible paths, the respective allocated path metric values m_A, m_:B, . . . , m_X, the number of respective hops, and the respective selection of possible paths according to rules a) to h) for the mesh network in FIG. 2, wherein only the mesh nodes: MP 4 and MP 7 involve devices in energy-saving mode or battery-operated devices.
FIG. 6: for a fourth exemplary embodiment in table form with four possible paths, the respective allocated path metric values m_A, m_:B, . . . , m_X, the number of respective hops, and the respective selection of possible paths according to rules a) to h) for the mesh network in FIG. 2, wherein only the mesh nodes: MP 5 and MP 7 involve devices in energy-saving mode or battery-operated devices.

DETAILED DESCRIPTION OF THE INVENTION

Figure 1:
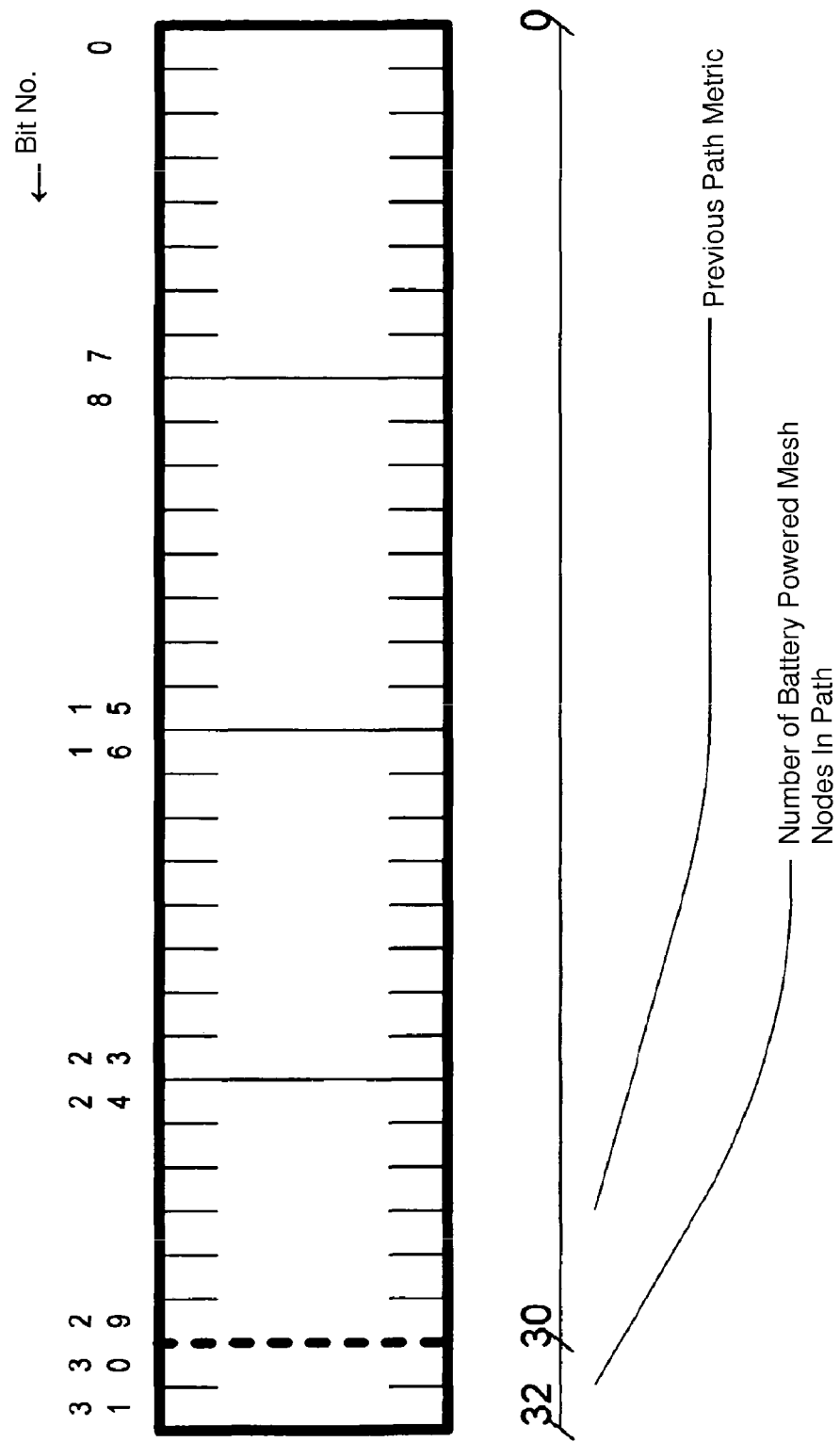
FIG. 1: an example for a path metric field with 32 bits, in which the "number of battery-operated mesh nodes in the path" is transmitted in HWMP with two bits (N=3).

It is integral to the invention that two parameters are used as routing metrics:
  the existing routing metric
  the number p of mesh nodes in the path that are battery-operated or operating in energy-saving mode.

From a technical functionality standpoint, the new parameter "number of mesh nodes in the path that are battery-operated or operating in energy-saving mode" actually contains the "number of mesh nodes in the path that will not or should not forward any data packets for other mesh nodes." The two most important reasons for such a method are:
  battery operation, because it saves the battery,
  energy-saving mode, which causes wait times when forwarding and is often used by battery-operated devices.

For this reason, the new parameter is called "number of mesh nodes in the path that are battery-operated or operating in energy-saving mode," even though the corresponding devices counted in it are not necessarily battery-operated and not all battery-operated devices must be counted in it, e.g., if they are only temporarily battery-operated and are also not in energy-saving mode, such as laptops. Whether a mesh node is counted in this new parameter should be established by a configuration parameter such as a flag or an MIB (Management Information Base) variable.

The value range for the parameter "number of mesh nodes in the path that are battery-operated or operating in energy-saving mode" is a positive whole number from 0 to N, where N means that N or more battery-operated mesh nodes are in the path.

Each battery-operated node increases the parameter p for the "number of mesh nodes in the path that are battery-operated or operating in energy-saving mode" by 1 when the path metric is updated, unless the parameter p has already reached its maximum value of N:

$$P\text{ new} = \begin{matrix} P\text{ old} + 1 & P\text{ old} < N \\ N & P\text{ old} = N \end{matrix}$$

N is set depending on the desired granularity of this parameter versus the resources required for it (number of bits). If only one bit is used, then N=1 and only 2 values are possible.

In practice, this means that only the statement of whether there are battery-operated mesh nodes in the path or not is possible. If more than one bit is used, then quantitative statements about the number of battery-operated mesh nodes in the path are also possible. Depending on the size of the mesh network, 2 bits (N=3) may be sufficient.

The target node now receives routing messages, in particular route request and path request messages, which in addition to the existing routing metric also have a statement regarding the presence of battery-operated mesh nodes in the corresponding path. This additional information can now be considered when selecting the path. In this way, different goals can be sought using different path selection rules.

Possible path selection rules a) to h), for determining whether Path A or Path B in the mesh network is "better," are listed below.

The following definitions apply to these rules:
P_A is Path A,
P_B is Path B,
P_A<P_B means that Path A is better than Path B,
m_A is the path metric of Path A,
m_B is the path metric of Path B,
m_X is the path metric of Path X,
m_A<m_B means that the path metric for Path A is better than the path metric for Path B,
n_A is the number of battery-operated mesh nodes in Path A,
n_B is the number of battery-operated mesh nodes in Path B,
n_X B is the number of battery-operated mesh nodes in Path X,
h_A is the number of hops in Path A,
h_B is the number of hops in Path B,
h_X is the number of hops in Path X.

For path selection according to the invention, the characteristics of two arbitrary paths A and B from among all possible paths X are compared to each other. The following rules a) to h) are applied using the four exemplary embodiments according to FIGS. 3-6.

a) Only paths with no mesh nodes that are battery operated or operating in energy-saving mode are used!
  Conditions: n_A=n_B=0, otherwise the path is not considered.
  P_A<P_B, if (m_A<m_B) and (n_A=n_B=0)
b) The path with the best metric is used.
  The presence of mesh nodes that are battery-operated or operating in energy-saving mode is not considered.
  P_A<P_B, if m_A<m_B
c) The best of the paths with the fewest mesh nodes that are battery-operated or operating in energy-saving mode is used.
  Conditions: n_A is the minimum of all n_X
  P_A<P_B, if (n_A<n_B) or ((n_A=n_B) and (m_A<m_B))
d) For each mesh node in the path that is battery-operated or operating in energy-saving mode, a "penalty" value Ps is added to the path metric.
  P_A<P_B, if m_A+n_A*p_s<m_B+n_B*p_s [* indicates multiplication]
e) From among all paths with a metric that is better than or equal to the path metric threshold value T_p, the path with the fewest mesh nodes that are battery-operated or operating in energy-saving mode is selected.
  T_p can be determined here either with absolute dependence on the metric used or relative to the best metric value (T_p=min(m_X)+å*min(m_X), where å is a positive real number and preferably 0≤å≤1).
  Conditions: m_A≤T_p and m_B≤T_p and n_A is the minimum of all n_X with m_X≤T_p
  P_A<P_B, if ((n_A<n_B) and (m_A≤T_p) and (m_B≤T_p)) or ((n_A=n_B) and (m_A<m_B) and (m_A≤T_p) and (m_B≤T_p))
f) From among all paths with an average link metric that is better than or equal to the link metric threshold value T_l, the path with the fewest mesh nodes that are battery-operated or operating in energy-saving mode is selected.
  T_l can be determined here either with absolute dependence on the metric used or relative to the best metric value (T_l=min(m_X/h_X)+å*min(m_X/h_X), where å is a positive real number and preferably 0≤å≤1).
  Conditions: m_A/h_A≤T_l and m_B/h_B≤T_l and n_A is the minimum of all n_X with m_X/h_X≤T_l
  P_A<P_B, if ((n_A<n_B) and (m_A/h_A<T_l) and (m_B/h_B≤T_l)) or ((n_A=n_B) and (m_A<m_B) and (m_A/h_A≤T_l) and (m_B/h_B≤T_l))
g) The path with the smallest portion of mesh nodes that are battery-operated or operating in energy-saving mode is used. P_A<P_B, if (n_A/h_A<n_B/h_B) or ((n_A/h_A=n_B/h_B) and (m_A<m_B))
h) Combinations of the rules are also possible.
  For example, only paths with no mesh nodes that are battery operated or in energy-saving mode can be considered first [Rule a)].
  Only when there are no such paths is another rule used, which also considers paths with battery-operated mesh nodes [e.g., Rule b), c), d), e), f), or g)].

For the maximum value N of the parameter p="Number of battery-operated mesh nodes in the path," N=3 appears to be an optimal value for mesh networks with up to about 50 mesh nodes, for the following reasons:
  N=3 allows more precise differentiation than N=1 (1 bit). A path with a good metric but 1, 2, or 3 battery-operated devices can be weighed against a path with a poorer metric but no battery-operated devices.
  N=3 can be represented with 2 bits to save space.
  3 bits would go up to N=7. A difference of whether 4 or 7 battery-operated mesh nodes are now in the path does not often lead to a different path selection. Paths with that many battery-operated mesh nodes are already undesirable.

The invention improves the consideration of mesh nodes that are battery-operated or operating in energy-saving mode and mesh nodes in energy-saving mode during path selection in wireless mesh networks.

The target node that is affected by a particular path selection receives explicit quantitative information about the presence and number of devices that are battery-operated or operating in energy-saving mode in the corresponding paths.

The actual path metric, which often reflects the wireless environment and often disregards the battery operation or energy-saving mode of individual devices in the path, is not changed. This means that the target node receives correct information about the path metric, regardless of the number of battery-operated devices in the path.

The invention has no additional wait time as in the aforementioned publication by Michelle Gong, Kazuyuki Sakoda, Jarkko Kneckt: "Thoughts on Interaction between Power Management and Path Selection," July 2007, IEEE 802.11, Document 11-07/2095r3, see in particular pages 17-18, where battery-operated mesh nodes are considered only if the path request is repeated. The invention does consider battery-operated mesh nodes in the first path request, but can still make the same decision as in this publication by Michelle Gong et al. ("best path that contains no mesh nodes that are battery-operated or operating in energy-saving mode" and "best path regardless of the number of mesh nodes in the path that are battery-operated or operating in energy-saving mode") and can also make many more granular assessments.

By applying the various rules during path selection in the target node, the use of devices that are battery-operated or operating in energy-saving mode and the quality of the path (path metric) can be weighed against each other depending on the established goals. The routing protocol HWMP (Hybrid Wireless Mesh Protocol) specified in the "IEEE P802.11s/ D2.0 Draft Standard" uses a metric field in its routing messages (route request, route reply, etc.) that is four bytes (32 bits) long. In order to convert the invention into HWMP, for example, m bits in this metric field can be used for the new parameter p="number of mesh nodes in the path that are battery-operated or operating in energy-saving mode." The available space for the existing metric field is then shortened to (32−m) bits.

FIG. 1 shows, as an example, the complete 32-bit metric field of HWMP messages with the expansion by means of the invention. Here the uppermost two bits are used for the new parameter p for the "number of mesh nodes in the path that are battery-operated or operating in energy-saving mode." In the example from FIG. 1, two bits are used for this new parameter p, which corresponds to the optimum considered value of N=3 in the invention. Thus, 30 bits remain available for the path metric and two bits for the "number of battery-operated mesh nodes in the path." The value of the path metric can be stated as any number that can be represented with 30 bits and is used by the network for the corresponding path according to the "IEEE P802.11s/D2.0 Draft Standard." As a rule, according to this standard, a total of 32 bits is allocated for defining the path metric value, whereas in the invention described above only 30 bits are used for the path metric value, and the remaining 2 bits that have become available, here in FIG. 1 the uppermost two bits, are used for the new parameter p for the "number of mesh nodes that are battery-operated or operating in energy-saving mode."

Figure 2:
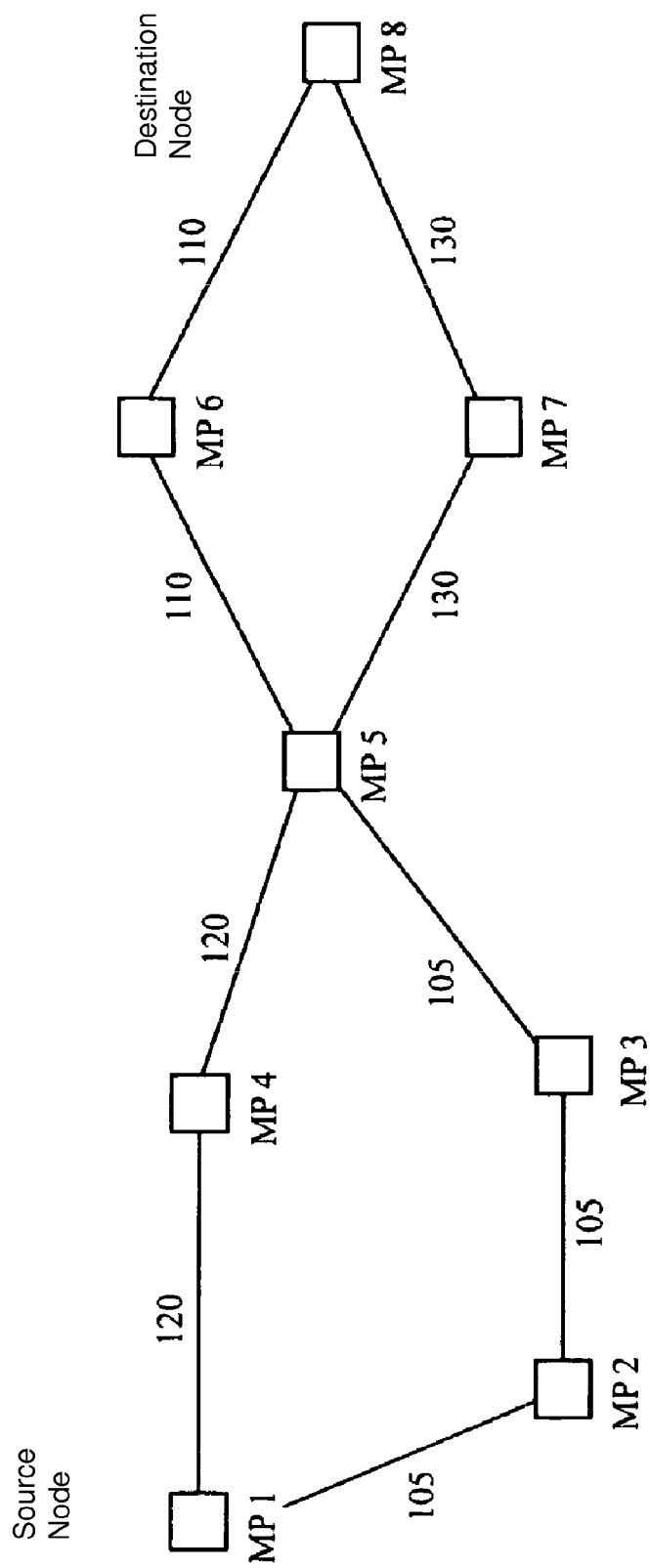
FIG. 2: an example of a mesh network for the explanation of four exemplary embodiments according to FIGS. 3-6.

The path selection according to the invention is illustrated for all of the rules established in the invention using the wireless mesh network example shown in FIG. 2. Here various mesh nodes are considered to be mesh nodes in energy-saving mode or battery-operated nodes, i.e., mesh nodes that increase the new parameter p during the path search.

For the additional parameters used in rules a) to h), the following values are considered to be given in the four exemplary embodiments described in FIGS. 3 to 6:

"Penalty value" $P_s$=80 for rule d)
Path metric threshold value T_p=min(m_X)+c*min(m_X) with c=0.2 and min(m_X)=460
Path metric threshold value T_p=552
Link metric threshold value T_l=120 (fixed value)

FIG. 2 shows an example of a mesh network for the explanation of four exemplary embodiments according to FIGS. 3-6.

The mesh network has the eight mesh nodes MP 1, MP 2, MP 3, MP 4, MP 5, MP 6, MP 7, and MP 8. There are many possible paths from source node MP 1 to target node MP 8, all of which run through mesh node MP 5. Each of the mesh nodes MP 1, MP 2, MP 3, MP 4, MP 6, MP 7, and MP 8 has a connection to two neighboring nodes. However, mesh node MP 5 has a connection to each of the four neighboring mesh nodes MP 3, MP 4, MP 6, and MP 7. Each connection to two neighboring mesh nodes has an assigned link metric value that is written for it. The smaller each link metric value, the "better" its connection. "Better" can mean, for example, that the connection costs are lower or that the data transfer quality is better or that it is a faster data connection. The sum of the link metric values for a path is the path metric value, which is expressed by the rightmost 30 bits in the 32-bit path metric field in FIG. 1, such that the "number of battery-operated mesh nodes in the path" in HWMP is expressed with two bits (N=3) in bit 31 and bit 32.

Each of FIGS. 3 to 6 contains a table for the respective path selection. The tables are arranged according to the same matrix layout, for which the representative table layout in FIG. 3 is explained below. The first column lists the four possible paths. The second column contains the sums of all link metric values for each possible path. The third column gives the number of hops (hop count), which corresponds to one fewer than the number of nodes per path; i.e., either path in the first two rows has a total of 5 nodes without the source node, so 4 hops.

In the fourth column, for the application of each rule a) to h), an "x" indicates whether this path is selected or may not be selected (shown by gray crosshatching), according to each of the rules. The four exemplary embodiments differ by variations in whether and/or how the mesh nodes are equipped with batteries or devices operating in energy-saving mode. Each such mesh node with a battery or device operating in energy-saving mode is printed in bold in the left column.

For the path in the first row designated as MP 1-MP 4-MP 5-MP 6-MP 8, which corresponds to the upper line in FIG. 1, the path metric value of 460=120+120+110+110 results from the sum of the four individual link metric values (2×120+2× 110=460). The required average link metric value of m_A/ h_A for rule f) comes out to 460:4=115. For example, for FIG. 3 and rule f), m_A/h_A=115≤Tl=120 meets the first condition for rule f). Because no devices that are battery-operated or operating in energy-saving mode are contained in the path, all of the other conditions are also met, so an "X" is placed in the field under rule f) in the first row. This path is therefore available according to rule f).

For the path in the second row designated as MP 1-MP 4-MP 5-MP 7-MP 8, which corresponds to the upper line in the left half and the lower line in the right half, the path metric value of 500=120+120+130+130 results from the sum of the four individual link metric values (2×120+2×130=500). The required average link metric value of m_A/h_A for rule f) comes out to 500:4=125. For example, for FIG. 3 and rule f), the first condition m_A/h_A=125≤T_l=120 is not valid because it does not fulfill the first condition of rule f), so the field under rule f) is crosshatched in black, indicating that this path is not available.

For the paths in the third or fourth rows, the average link metric m_A/h_A required for rule f) is 535:5=107 or 575.5=115.

FIG. 3 shows, for a first exemplary embodiment in table form with four possible paths, the respective allocated path metric values m_A, m_:B, ..., m_X, the number of respective hops, and the respective selection of possible paths according to rules a) to h) for the mesh network in FIG. 2, wherein as a special case none of the mesh nodes involves a device in energy-saving mode or a battery-operated device. In this case the result for all rules a) to h) is that the upper path (FIG. 2) in the first row of the table is selected. For the path in the second row, the average link metric value m_A/h_A=500:4=125, which is greater than the maximum allowable threshold value T_l=120, so this path is not available according to rule f), and therefore the corresponding table field is crosshatched in black. The same criteria apply to the other black-crosshatched fields in this table.

FIG. 4 shows, for a second exemplary embodiment in table form with four possible paths, the respective allocated path metric values m_A, m_:B, ..., m_X, the number of respective hops, and the respective selection of possible paths according to rules a) to h) for the mesh network in FIG. 2, wherein only the mesh node: MP 7 involves devices in energy-saving mode or battery-operated devices. The result for the path selected or rejected according to rules a) to h) is shown in the fourth column by an "x" being entered or by black crosshatching.

FIG. 5 shows, for a third exemplary embodiment in table form with four possible paths, the respective allocated path metric values m_A, m_:B, ..., m_X, the number of respective hops, and the respective selection of possible paths according to rules a) to h) for the mesh network in FIG. 2, wherein only the mesh nodes: MP 4 and MP 7 involve devices in energy-saving mode or battery-operated devices. The result for the path selected or rejected according to rules a) to h) is shown in the fourth column by an "x" being entered or by black crosshatching.

FIG. 6 shows, for a fourth exemplary embodiment in table form with four possible paths, the respective allocated path metric values m_A, m_:B, ..., m_X, the number of respective hops, and the respective selection of possible paths according to rules a) to h) for the mesh network in FIG. 2, wherein only the mesh nodes: MP 5 and MP 7 involve devices in energy-saving mode or battery-operated devices. The result for the path selected or rejected according to rules a) to h) is shown in the fourth column by an "x" being entered or by black crosshatching.

As a general rule, the invention searches for the path that has the fewest nodes or hops and whose path metric lies below a predetermined threshold value. If the evaluated paths have the same number of nodes that are battery-operated or operating in energy-saving mode, it takes the path with the better path metric—see rules e) and f). Here the path metric is the quality for transferring data packets from the source node through the nodes in the mesh network to the target node, whereby, for example, they can also be defined as connection costs (e.g., telephone charges from the USA through Kenya to Germany may be cheaper than through Great Britain or vice versa), which must be paid by the user to the network operator. The path metric can also indicate the number of hops and therefore also the signal delay time, because, for example, telephone conversations through one or more satellites have signal delay times that are too long, such that there are long pauses in the telephone conversation before a response can be sent.

The invention claimed is:

1. A method for determining a route for sending a message in a mesh network, comprising:
  interpreting routing messages sent by a source node along various paths through a plurality of mesh nodes of the mesh network to a target node to determine a best path for sending data packets from the source node to the target node, wherein in each routing message sent from the source node through various paths to the target node, a parameter p with a number of bits indicates a number of mesh nodes in a path that are operating in a state selected from the group consisting of energy-saving mode and battery-operated mode, and wherein remaining bits of the routing message comprise a metric field that identifies a path metric that identifies a hop count for a path along which that routing message passed;
  each mesh node that receives one of the routing messages that is one of battery operated and operated in energy-saving mode, increasing a value of parameter p by a predetermined value when the path metric is updated by that node unless parameter p has already reached a maximum value for parameter p; and
  selecting the best path between the source node and target node based on at least one predetermined selection rule that takes into account information about how many battery-operated mesh nodes is located in each of the available paths between the source node and the target node;
  wherein a number of bits for the parameter p that indicates the number of mesh nodes in the path that are operating in a state selected from the group consisting of energy-saving mode and battery-operated mode is at least two bits and is within a thirty-two bit metric field of the routing message that is used for the path metric, a portion of the metric field that does not include the parameter p being a number of bits that is equal to thirty-two bits minus a size in bits of parameter p.

2. The method of claim 1 wherein the number of bits for the parameter p that indicates the number of mesh nodes in the path that are operating in a state selected from the group consisting of energy-saving mode and battery-operated mode is two bits.

3. The method of claim 1 wherein the number of bits for the parameter p that indicates the number of mesh nodes in the path that are operating in a state selected from the group consisting of energy-saving mode and battery-operated mode is at least two bits.

4. The method of claim 1 wherein the selecting of the best path occurs based on the value of parameter p such that the best path has a fewest hops and that has a path metric that lies within a preset threshold value when a number of mesh nodes that are one of battery-operated and in energy-saving mode is the same for each of the paths.

5. The method of claim 1 wherein only paths that do not have any mesh nodes that are one of battery-operated and operating in energy-saving mode are selectable as the best path based on the value of parameter p.

6. The method of claim 1 wherein only paths with the best path metric are selectable.

7. The method of claim 1 wherein the path with fewest mesh nodes that are one of battery-operated and in energy-saving mode is selected as the best path based on the value of parameter p.

8. The method of claim 1 wherein each mesh node that is one of battery-operated and operating in energy-saving mode adding a preset penalty value ps to the path metric value when increasing the value of parameter p.

9. The method of claim 1 wherein the best path is selected from among all paths with a path metric that is better than or equal to a path metric threshold value, the path with fewest mesh nodes that are one of battery-operated and operating in energy-saving mode being the best path.

10. The method of claim 1 wherein the path with fewest mesh nodes that are one of battery-operated and operating in energy-saving mode is selected as the best path from among all paths with an average link metric value that is calculated from the path metric value divided by the number of hops and is better than or equal to a preset link metric threshold value.

11. The method of claim 10 wherein the number of bits for the parameter p that indicates the number of mesh nodes in the path that are operating in a state selected from the group consisting of energy-saving mode and battery-operated mode is two bits or at least two bits.

12. The method of 1 wherein the selecting of the best path is based on two or more predetermined rules.

13. A mesh network configured for establishing a routing metric wherein a source node sends routing messages on various paths via mesh nodes of the mesh network to a target node to be interpreted to determine a best path for sending data packets from the source node to the target node, the network comprising:
    the target node;
    the source node;
    a plurality of mesh nodes connected to each other, the mesh nodes communicatively connecting the source node to the target node via a plurality of different paths;
    the target node interpreting routing messages sent via various paths from the source node through the mesh nodes to the target node to determine the best path for sending data packets from the source node to the target node, wherein in each routing message sent from the source node through the various paths to the target node, a parameter p with a number of bits indicates a number of mesh nodes in a path that are operating in a state selected from the group consisting of energy-saving mode and battery-operated mode, and wherein remaining bits of the routing message comprise a metric field that shows a path metric that identifies a hop count for a path along which that routing message passed;
    each of the mesh nodes that receives one of the routing messages that is one of battery operated and operated in energy-saving mode, increasing a value of parameter p by a predetermined value when the path metric is updated by that node unless parameter p has already reached a maximum value for parameter p; and
    the target node selecting the best path between the source node and target node based on at least one predetermined selection rule that takes into account information about how many battery-operated mesh nodes is located in each of the available paths between the source node and the target node;
    wherein a number of bits for the parameter p that indicates the number of mesh nodes in the path that are operating in a state selected from the group consisting of energy-saving mode and battery-operated mode is at least two bits and is within the metric field, the metric field having a size of thirty-two bits, the metric field of the routing message being used for the path metric, a remaining portion of the metric field that does not include the parameter p being a number of bits that is equal to thirty-two bits minus a size in bits of parameter p.

14. The network of claim 13 wherein the number of bits for the parameter p that indicates the number of mesh nodes in the path that are operating in a state selected from the group consisting of energy-saving mode and battery-operated mode is two bits.

15. The network of claim 13 wherein the selecting of the best path occurs based on the value of parameter p such the best path has a fewest hops and that has a path metric that lies within a preset threshold value when a number of mesh nodes that are one of battery-operated and in energy-saving mode is the same for each of the paths.

16. The network of claim 13 wherein only paths that do not have any mesh nodes that are one of battery-operated and operating in energy-saving mode are selectable as the best path.

17. The network of claim 13 wherein the path with fewest mesh nodes that are one of battery-operated and in energy-saving mode is selected as the best path.

18. The network of claim 13 wherein the best path is selected from among all paths with a path metric that is better than or equal to a path metric threshold value, the path with fewest mesh nodes that are one of battery-operated and operating in energy-saving mode being the best path.

19. The network of claim 13 wherein the path with fewest mesh nodes that are one of battery-operated and operating in energy-saving mode is selected as the best path from among all paths with an average link metric value that is calculated from the path metric value divided by the number of hops and is better than or equal to a preset link metric threshold value.

* * * * *